United States Patent [19]
Collins et al.

[11] Patent Number: 5,904,271
[45] Date of Patent: May 18, 1999

[54] CHOPPING BOARD SYSTEM

[76] Inventors: Philip D. Collins, 671A Mentone Ave., Grover Beach, Calif. 93433; Elizabeth K. Collins, 105 Narlene Ave., Pismo Beach, Calif. 93449; Kenneth J. Knirck, 2250 King St. #64, San Luis Obispo, Calif. 93401

[21] Appl. No.: 08/871,699

[22] Filed: Jun. 9, 1997

Related U.S. Application Data

[60] Provisional application No. 60/019,828, Jun. 12, 1996.

[51] Int. Cl.$^6$ .................................................. B67D 5/38
[52] U.S. Cl. ........................................ 222/158; 222/143
[58] Field of Search .................... 222/158, 192, 222/143, 108; 7/698, 505

[56] References Cited

U.S. PATENT DOCUMENTS

| D. 99,405 | 4/1936 | Marschall | 222/158 |
|---|---|---|---|
| 163,481 | 5/1875 | Gray . | |
| D. 262,931 | 2/1982 | LeVan | D7/3 |
| D. 372,176 | 7/1996 | Meisner | D7/698 |

*Primary Examiner*—Andres Kashnikow
*Assistant Examiner*—David Deal

[57] ABSTRACT

A chopping board system comprising a chopping board member having a substantially planar chopping surface, defined by a perimeter edge and a leg connecting surface; two latitudinal leg members extending from the leg connecting surface and sized such that when the chopping board member is supported on a planar surface by the leg members, the chopping board surface is oriented in parallel with the planar surface. A tab-in-slot connecting mechanism to temporarily hold purpose built collection hoppers at either end of the chopping board surface, one hopper being for the collection of chopped food and the other hopper being for the collection of cut scrap food. The two hoppers are similar in that their openings are dimensioned in a way as to make the upper edge of the hoppers no higher than the surface of the cutting board and so that their width be no greater than the width of the cutting surface. This close mating of the hoppers and the chopping board facilitates the easy and clean removal of the chopped food from the cutting surface to the hoppers. The two hoppers differ in that the chopped food hopper has relatively high angled walls that form a chute, which allows the chopped food to be poured easily from the chopped food hopper. The pouring chute also incorporates a series of horizontal graduate lines, which allow the hopper to be used as a measuring device.

1 Claim, 2 Drawing Sheets

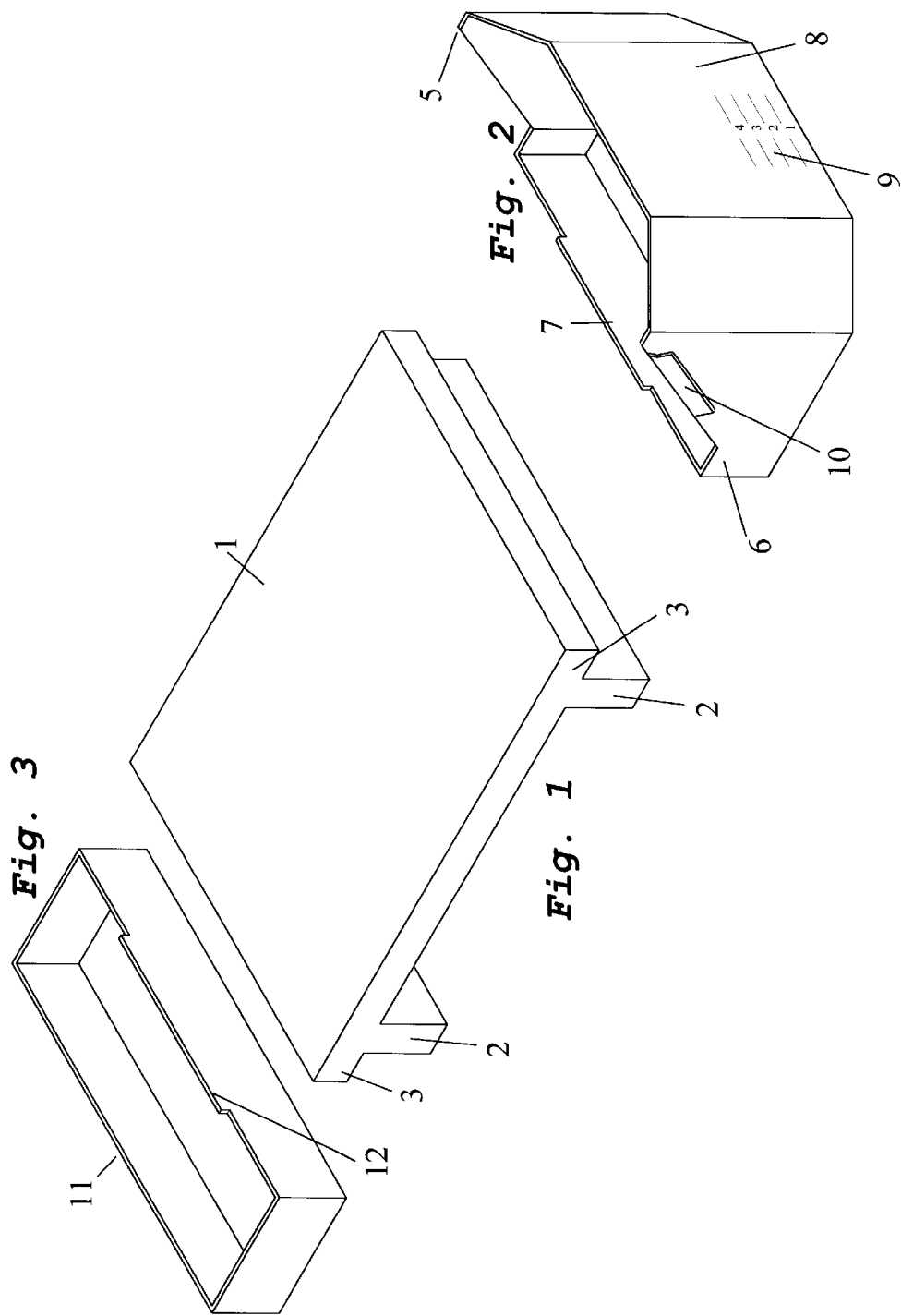

CHOPPING BOARD SYSTEM

CROSS-REFERENCES TO RELATED APPLICATIONS

Provisional Patent number 60/019,828 was filed on Jun. 12, 1996.

STATEMENT AS TO RIGHTS TO INVENTIONS MADE UNDER FEDERALLY-SPONSORED RESEARCH AND DEVELOPMENT.

None cited.

BACKGROUND OF THE INVENTION

Field of the Invention

This invention relates to the field of food preparation, specifically the chopping, slicing or dicing of a whole piece of food into a measured amount of processed food, as determined by a recipe.

Description of Prior Art

It is often necessary when preparing food to chop, dice or slice the ingredients before introducing them to the cooking vessel or measuring cup. This chopping can be accomplished using various devices, the most common of which is a chopping board and knife. Typically, once the food has been chopped, it is transferred to the cooking vessel or to a measuring cup by lifting the board and its contents to its destination and scraping the food off of the board with the knife blade.

This procedure works well when the quantity of chopped or sliced food is not critical, or when the chopped food is being transferred to a cooking vessel, which has a very large opening. Attempting to scrape the food into a conventional measuring cup or a cooking vessel with a relatively small opening often results in a considerable quantity of the food falling to the stove top, counter or floor. It would be a benefit, therefore, to have a chopping board system, which utilized an attached chopped food hopper and measuring cup. Because lifting a heavy chopping board with one hand while holding a sharp knife in the other can be dangerous, it would be of further benefit if the cutting surface of the board were flush with the opening of the food hopper, thus allowing the chopped food to be easily moved from the chopping surface to the hopper/measuring cup without the need to lift and carry the entire chopping board.

SUMMARY OF THE INVENTION

The present invention described includes an elevated planar chopping surface having specifically designed hoppers at opposite ends of the chopping board for the collection and measuring of prepared food at one end, and the collection of scrap food cuttings at the other end.

The chopped food hopper consists of a plurality of vertical sidewalls, which are joined at angles to one another to form a pouring spout or chute. It also incorporates a series of graduations for measuring its contents. It is recommended that the hopper be constructed of a transparent material in order to be able to view the contents of the hopper from the side having the measuring graduates on it. The hopper also incorporates a means of attachment to the chopping board and a handle to facilitate the easy carrying of the hopper and its contents to the cooking vessel. When it is attached to the chopping board, the mouth of the hopper is flush with the under surface of the chopping board. The mouth of the hopper is also exactly the same width as the cutting surface; thus permitting an easy transfer of cut food product from the cutting surface to the hopper with a minimum of spillage.

At the opposite end of the chopping board from the chopped food hopper is located another hopper which is used specifically for collecting the cut food scraps. Like the other, the mouth of the scrap hopper is flush with the under surface, and the same width as, the cutting surface.

The chopped food hopper has an extended apron, which fits under the extended ends of the cutting board The scrap hopper itself fits under the cutting surface extension. On the leading edge of both hoppers is a vertical tab which, when the chopping board is lifted slightly, can be received by a slot which is cut into the under-surface of the cutting board, just adjacent to the legs. In this way, the hoppers can be securely attached to the chopping board. They can be removed by slightly elevating either end of the cutting board so as to disengage the anchoring tab from the anchoring slot.

BRIEF DESCRIPTION OF THE DRAWINGS

FIG. 1 is a perspective view of the embodiment of the chopping board portion of the described chopping board system.

FIG. 2 is a perspective view of the chopped food hopper/measuring cup portion of the described chopping board system.

FIG. 3 is a perspective view of the cut food scrap portion of the described chopping board system.

DESCRIPTION OF THE PREFERRED EMBODIMENTS OF THE INVENTION

Figure 4:
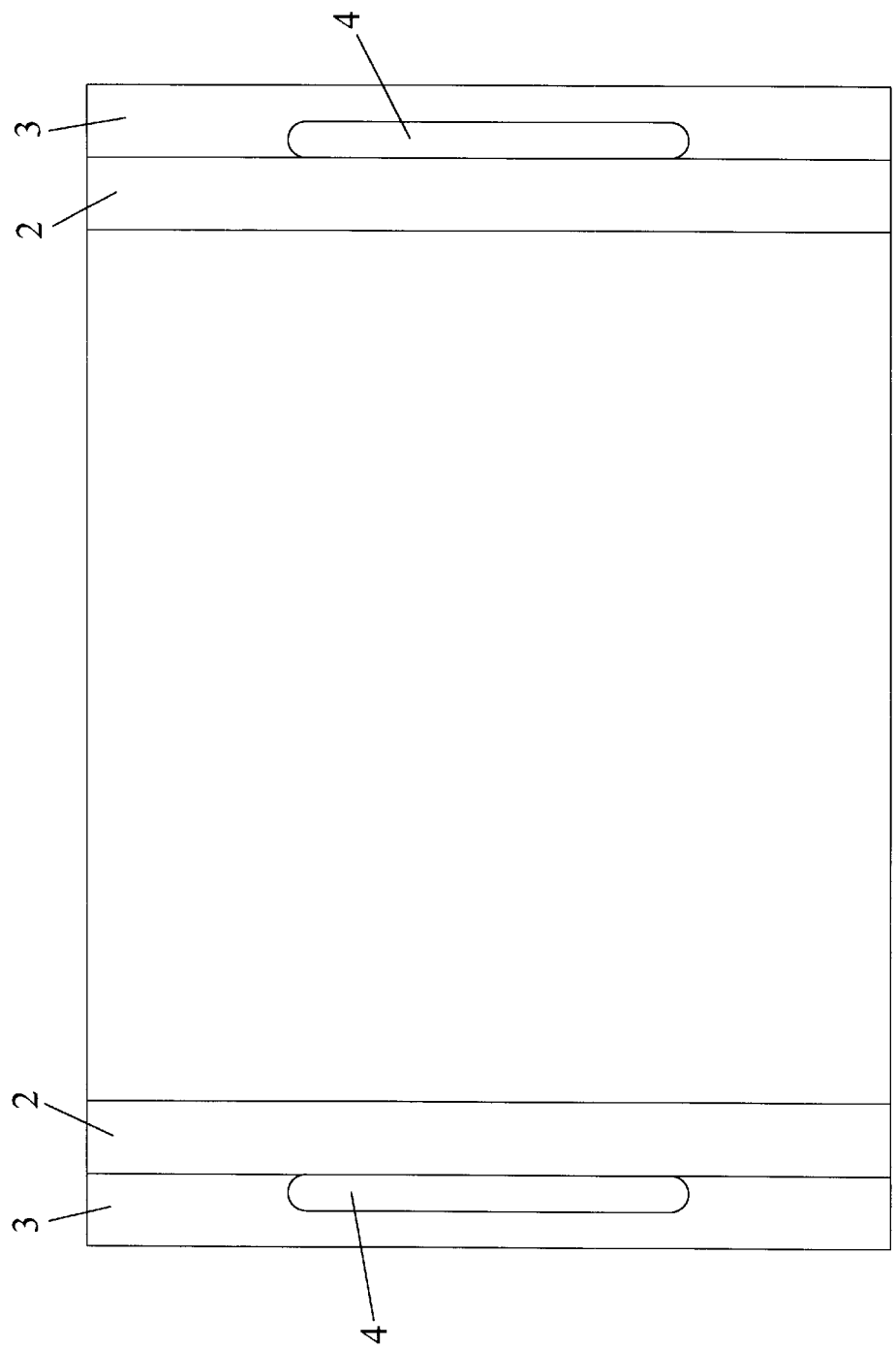
FIG. 4 is a plane bottom view of the embodiment of the chopping board portion of the described chopping board system.

FIGS. 1, 2 and 3 show perspective views of the three component parts of the invention. The invention is comprised of the chopping board (1), the chopped food hopper (5), and the scrap hopper (11). The chopping board (1) is further comprised of the legs (2) and the cutting surface extensions (3). The chopped food hopper (5) is comprised of the apron (6), the anchoring tab (7), the pouring chute (8), the measuring graduates (9), and the handle (10). The scrap hopper (11) is rectangular box whose only distinguishing feature is the anchoring tab (12). FIG. 4 shows a plane view of the under side of the chopping board (1). This view shows the legs (2), the cutting surface extensions (3), and the hopper anchoring slots (4).

The chopping board is raised above tabletop on which it rests by the legs (2). The invention is assembled by raising one end of the chopping board (1) so as to allow the apron (6) of the chopped food hopper (5) to be slid under the cutting surface extension (3) until the anchoring tab (7) engages with the anchoring slot (4). When the chopping board is lowered, the weight of the board holds the chopped food hopper in place. The scrap hopper (11) is attached to the chopping board in the same manner using its anchoring tab (12).

Once assembled, food can be chopped, diced, or sliced on the chopping board. Using a knife or the operator's hand, the processed food can be scraped into the chopped food hopper where the contents of said hopper can be measured using the graduates (9) which are printed on the pouring chute (8). The scrap food can be scraped into the scrap hopper (11). To move the contents of the chopped food hopper to the cooking or mixing vessel, the end of the chopping board is lifted high enough to disengage the anchoring tab from the anchoring slot. The hopper can then be removed by sliding it out from under the cutting surface extension. The chopped food hopper can be lifted by means of the handle (10) and carried to the cooking or mixing vessel. When the hopper is tilted, the contents of the hopper slides down the pouring chute (8) and into the desired vessel. The scrap food hopper and its contents can be removed in the same manner as the chopped food hopper by lifting the chopping board and disengaging the anchoring tab (12) from the anchoring slot. It can then be carried away to be dumped in an appropriate receptacle.

The chopping board itself is bilaterally symmetrical in that all of the features and dimensions are identical at either end, so as to allow either hopper to be placed at either end of the board. The size and relative shape of the invention can be freely modified depending on the use. The size may range from very small for use in a motor home or when camping, or it may be very large for commercial kitchens. The size and shape of the various hoppers may also be adapted for special use. The depth and height of the hopper may be changed to accommodate a specific use.

The chopping board should be constructed of a high-impact, high-density material such as hard wood or plastic, If plastic is used in the construction of the board, a non-absorbent inert formula should be used in order to minimize bacterial growth on the surface. The hoppers should be constructed of a high-impact transparent plastic to prevent breakage, to allow the contents of the hoppers to be seen and measured, and to allow for machine washing. Non-skid feet on the bottom surface of the legs may be a desirable feature.

What is claimed:

1. A food preparation device comprising a main unit and a first bin, the main unit further comprising
   a cutting surface on an upper side,
   a lower side supported by an inset leg,
   a groove adjacent an edge of the lower side, the first bin further comprising
   a plurality of walls, the wall supporting a floor,
   one wall further comprising a tongue portion above the rest of the wall opposite of the floor, the tongue sized to fit the groove of the main unit,
   one wall further comprising graduated markings corresponding to partial volumes of the bin,
   one wall further comprising a pouring chute, the tongue of the bin cooperates with the groove of the main unit to secure the bin in proximity to the main unit when the food preparation device is placed on a workspace, the bin sized to allow the tongue to disengage the groove when the bin is tilted, and allowing the bin to be removably attached to the food preparation device.

\* \* \* \* \*